(12) United States Patent
Choi et al.

(10) Patent No.: US 11,279,637 B2
(45) Date of Patent: Mar. 22, 2022

(54) ELECTRODIALYSIS CELLS BASED ON THE USE OF REDOX MEDIATORS

(71) Applicant: WISCONSIN ALUMNI RESEARCH FOUNDATION, Madison, WI (US)

(72) Inventors: Kyoung-Shin Choi, Fitchburg, WI (US); Dohwan Nam, Madison, WI (US); Dong Ki Lee, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 262 days.

(21) Appl. No.: 16/182,696

(22) Filed: Nov. 7, 2018

(65) Prior Publication Data
US 2020/0140296 A1    May 7, 2020

(51) Int. Cl.
*B01D 61/46* (2006.01)
*C02F 1/469* (2006.01)
*C02F 103/08* (2006.01)

(52) U.S. Cl.
CPC ............ *C02F 1/4693* (2013.01); *B01D 61/46* (2013.01); *B01D 2311/25* (2013.01); *B01D 2313/345* (2013.01); *B01D 2313/365* (2013.01); *C02F 2103/08* (2013.01); *C02F 2201/009* (2013.01)

(58) Field of Classification Search
CPC .... B01D 61/422; B01D 61/44; B01D 61/445; B01D 61/46; B01D 61/50; C02F 1/4693; C02F 2201/46115
See application file for complete search history.

(56) References Cited

U.S. PATENT DOCUMENTS

| 3,239,442 | A | * | 3/1966 | Tirrell | B01D 61/50 204/529 |
| 3,752,749 | A | * | 8/1973 | Chlanda | B01D 61/44 204/530 |
| 10,821,395 | B2 | | 11/2020 | Beh et al. | |
| 2006/0219574 | A1 | | 10/2006 | Rahman et al. | |
| 2016/0152492 | A1 | | 6/2016 | Bhikhi et al. | |
| 2017/0250434 | A1 | * | 8/2017 | Gennett | H01M 8/188 |
| 2018/0141834 | A1 | * | 5/2018 | Wessling | B01D 15/363 |

(Continued)

FOREIGN PATENT DOCUMENTS

| JP | 04018919 A * | 1/1992 | ............ B01D 61/44 |
| JP | 2015-167922 | 9/2015 | |

OTHER PUBLICATIONS

Nam et al., "Tandem Desalination/Salination Strategies Enabling the Use of Redox Couples for Efficient and Sustainable Electrochemical Desalination," ACS Appl. Mater. Interfaces 2019, 11, pp. 38641-38647.

(Continued)

*Primary Examiner* — Salil Jain
(74) *Attorney, Agent, or Firm* — Bell & Manning, LLC; Michelle Manning

(57) ABSTRACT

Electrodialysis cell systems for water deionization is provided. Also provided are methods for using the electrodialysis cell systems. The cells use the forward and reverse reactions of a redox mediator and the combined operations of a deionization cell and an ion-accumulation cell to enable sustainable deionization with a significantly decreased operating voltage, relative to conventional deionization cells. The cells have applications in seawater desalination, water purification, and wastewater treatment.

16 Claims, 12 Drawing Sheets

(56) References Cited

U.S. PATENT DOCUMENTS

2019/0240623 A1* 8/2019 Beh ................. C02F 1/4693
2020/0070094 A1* 3/2020 Hussaini ............ C25D 1/006

OTHER PUBLICATIONS

Sadrzadeh et al., "Sea water desalination using electrodialysis," Desalination 221 (2008) pp. 440-447.

International Search Report and Written Opinion issued on PCT/US2019/055507, dated Jan. 23, 2020.

Gratzel et al., Photoelectrochemical Cells, Nature, vol. 414, Nov. 2001, pp. 338-344.

Liu et al., A Total Organic Aqueous Redox Flow Battery Employing a Lost Cost and Sustainable Methyl Viologen Anolyte and 4-HO-TEMPO Catholyte, Adv. Energy Mater., vol. 6, 2015, 8 pages.

Nutting et al., Tetramethylpiperidine N-Oxyl (TEMPO), Phthalimide N-Oxyl (PINO), and Related N-Oxyl Species: Electrochemical Properties and Their Use in Electrocatalytic Reactions, Chem. Rev., 2018, 118 (9), pp. 4834-4885.

Ciriminna et al., Industrial Oxidations with Organocatalyst TEMPO and Its Derivatives *Org. Process Res. Dev.,* 2010, 74(1), pp. 245-251.

Gerischer, Heinz, Electrochemical Photo and Solar Cells Principles and Some Experiments, Electroanalytical Chemistry and Interfacial Electrochemistry, 58, 1975, pp. 263-274.

\* cited by examiner

ELECTRODIALYSIS CELLS BASED ON THE USE OF REDOX MEDIATORS

REFERENCE TO GOVERNMENT RIGHTS

This invention was made with government support under 1305124 awarded by the National Science Foundation. The government has certain rights in the invention.

BACKGROUND

The lack of access to fresh water is one of the most serious issues that the world is facing. Considering the abundance of seawater on Earth, seawater desalination has the possibility to offer a sustainable and unlimited supply of fresh water. Distillation and reverse osmosis (RO) have been used for seawater desalination, with RO being the more cost-effective option. However, the cost of RO is still high due to the considerable electrical energy input required to operate high pressure pumps.

Another desalination technology, which has been used for brackish water desalination, is electrodialysis (ED). The key difference between ED and distillation and RO is that ED removes salt ions from saline water, while distillation and RO remove water from the saline water. Considering the amounts of salt and water present in seawater, ED should be able to achieve desalination with higher recovery of water at a lower cost than RO. However, while ED is a cost-effective method for brackish water desalination, it is currently less cost-effective than RO for seawater desalination. This is because the current electrode reactions used in ED cells to induce ion movement require a high operating voltage. ED performed in aqueous solutions typically utilizes water reduction to $H_2$ as the cathode reaction and $Cl^-$ oxidation to $Cl_2$ or water oxidation to $O_2$ as the anode reaction. The thermodynamic equilibrium cell potentials required to achieve water reduction/$Cl^-$ oxidation and water reduction/water oxidation under standard conditions are 1.36 V and 1.23 V, respectively. The actual operating voltages are significantly higher than these thermodynamic potentials due to the kinetic overpotentials necessary to drive these reactions at desired rates as well as other voltage losses (e.g. IR loss in solution, junction potentials across membranes).

SUMMARY

Electrodialysis cells and tandem electrodialysis cell systems, as well as methods for using the electrodialysis cells and cell systems to deionize ion-containing solutions, including seawater, are provided.

One embodiment of an electrodialysis cell includes: an anolyte in an anode compartment, the anolyte comprising a reduced species and an oxidized species of a redox couple; a catholyte in a cathode compartment, the catholyte comprising the reduced species and the oxidized species of the same redox couple; at least one deionization compartment comprising a solution comprising cations and anions between the anode compartment and the cathode compartment, wherein the deionization compartment is bounded by an anion exchange membrane on an anode side of the deionization compartment and by a cation exchange membrane on a cathode side of the deionization compartment; an anode in electrical communication with the anolyte in the anode compartment; and a cathode in electrical communication with the catholyte in the cathode compartment.

One embodiment of a tandem cell system includes a deionization cell and an ion-accumulation cell that are connected and operate in tandem. The deionization cell includes: an anolyte in an anode compartment, the anolyte comprising a reduced species and an oxidized species of a redox couple; a catholyte in a cathode compartment, the catholyte comprising the reduced species and the oxidized species of the same redox couple; at least one deionization compartment comprising a solution comprising cations and anions between the anode compartment and the cathode compartment, wherein the deionization compartment is bounded by an anion exchange membrane on an anode side of the deionization compartment and by a cation exchange membrane on a cathode side of the deionization compartment; an anode in electrical communication with the anolyte in the anode compartment; and a cathode in electrical communication with the catholyte in the cathode compartment. The ion-accumulation cell includes: an anolyte in an anode compartment, the anolyte comprising the reduced species and the oxidized species of the redox couple; a catholyte in a cathode compartment, the catholyte comprising the reduced species and the oxidized species of the redox couple; at least one ion-accumulation compartment comprising a solution between the anode compartment and the cathode compartment, wherein the ion-accumulation compartment is bounded by a cation exchange membrane on an anode side of the ion-accumulation compartment and by an anion exchange membrane on a cathode side of the ion-accumulation compartment; an anode in electrical communication with the anolyte in the anode compartment; and a cathode in electrical communication with the catholyte in the cathode compartment. One or more conduits connect the anode compartment of the deionization cell and the cathode compartment of the ion-accumulation cell and are configured to allow the anolyte from the deionization cell to circulate into the cathode compartment of the ion-accumulation cell and the catholyte from the ion-accumulation cell to circulate into the anode compartment of the deionization cell. Similarly, one or more conduits connect the cathode compartment of the deionization cell to the anode compartment of the ion-accumulation cell and are configured to allow the catholyte from the deionization cell to circulate into the anode compartment of the ion-accumulation cell and the anolyte from the ion-accumulation cell to circulate into the cathode compartment of the deionization cell.

One embodiment of a method for deionizing an ion-containing solution using a tandem cell system includes: oxidizing the reduced species in the anode compartment of the deionization cell, which increases the cation to anion ratio in the anode compartment, and reducing the oxidized species in the cathode compartment of the deionization cell, which increases the anion to cation ratio in the cathode compartment, causing cations from the deionization compartment to move into the anode compartment of the deionization cell through the cation exchange membrane and anions from the deionization compartment to move into the cathode compartment of the deionization cell through the anion exchange membrane to maintain the charge neutrality in both the anode and cathode compartments, thereby deionizing the aqueous solution in the deionization compartment. At the same time, the method includes oxidizing the reduced species in the anode compartment of the ion-accumulation cell and reducing the oxidized species in the cathode compartment of the ion-accumulation cell, causing anions from the anode compartment of the ion-accumulation cell to move into the ion-accumulation compartment through the anion exchange membrane and cations from the cathode compartment of the ion-accumulation cell to move into the ion-accumulation compartment through the cation exchange membrane, thereby accumulating ions in the solution in the ion-accumulating compartment. During the operation of the tandem cell system, the anolyte from the deionization cell is circulated into the cathode compartment of the ion-accumulation cell and the catholyte from the ion-accumulation cell is circulated into the anode compartment of the deionization cell. Similarly, the catholyte from the deionization cell is circulated into the anode compartment of the ion-accumulation cell and the anolyte from the ion-accumulation cell is circulated into the cathode compartment of the deionization cell. This allows the ions accumulated in the anolyte and catholyte of the deionization cell to be moved over to the ion-accumulated compartment in the ion-accumulated cell.

As described above, the deionization cells and the ion-accumulation cells have at least one deionization compartment and at least on ion-accumulation compartment, respectively. However, it should be noted that this includes embodiments of the deionization cells that have more than one deionization compartment and one or more ion-accumulation compartments. Similarly, it includes ion-accumulation cells can have more than one ion-accumulation compartment and one or more deionization compartments. Such cells are described in greater detail below, with respect to FIG. 6.

Some embodiments of the tandem cell systems function as desalination/salination cell systems for the removal of sodium and chloride ions from a solution, such as seawater, brackish water, or industrial, commercial or residential wastewater.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 1A illustrates a conventional desalination ED cell. FIG. 1B shows a desalination ED cell that uses a TEMPOL/TEMPOL$^+$ redox couple. FIG. 1C shows a tandem cell system that include a desalination ED cell and a salination ED cell that enables the sustainable use of the TEMPOL/TEMPOL$^+$ redox couple for desalination.

FIG. 4A shows a cyclic voltammogram (CV) obtained in a 0.6 M NaCl solution containing 50 mM TEMPOL and 50 mM TEMPOL$^+$ with a scan rate of 10 mV s$^{-1}$. FIG. 4B depicts biases between a graphite anode and graphite cathode to generate a current density of 0-8 mA cm$^{-2}$ (solid arrows), with individual electrode potentials vs. Ag/AgCl indicated (dashed arrows). FIG. 4C shows a J-t plot (solid) and corresponding Q-t plot (dashed) obtained for the desalination cell and the salination cell at the operating voltage of 0.6 V. FIG. 4D shows the change in salt concentration measured in the middle compartment of the desalination cell during ED operation.

FIG. 5A shows J-t plots for desalination and salination solar cells that include a BiVO$_4$ photoanode. FIG. 5B shows the J-V characteristics of the BiVO$_4$ photoanode under illumination mimicking solar irradiation (AM1.5G, 100 mA/cm$^2$) in a three-compartment desalination solar cell. FIG. 5C depicts a three-compartment regenerative solar cell that can achieve desalination.

DETAILED DESCRIPTION

ED cell systems for removing ions from ion-containing solutions are provided. Also provided are methods for using the ED cell systems to deionize ion-containing solutions. The cells use the forward and reverse reactions of a redox couple and the combined operations of a deionization cell and an ion-accumulation cell to enable sustainable deionization with a significantly decreased operating voltage, relative to conventional deionization cells. In one embodiment, a combination deionization/ion-accumulation solar cell design is used to convert solar energy into electricity, while carrying out the deionization and ion-accumulation of ion-containing solutions, thereby coupling the functions of deionization and solar electricity generation in a single device.

The redox couple is composed of an oxidized form and a reduced form of a species. Redox couples that have extremely fast oxidation and reduction kinetics are often called redox mediators because they can be used to mediate other oxidation and reduction reactions. TEMPOL/TEMPO$^+$ is a good example of a redox mediator. The redox couples used in the ED cells described herein include redox couples that are known redox mediators. However, in the present cells, they are not used to mediate other redox reactions. Instead, their oxidation and reduction reactions are used to operate the ED cells to take advantage of their fast redox kinetics in order to minimize the overpotential requirements of the cells.

Figure 1B:
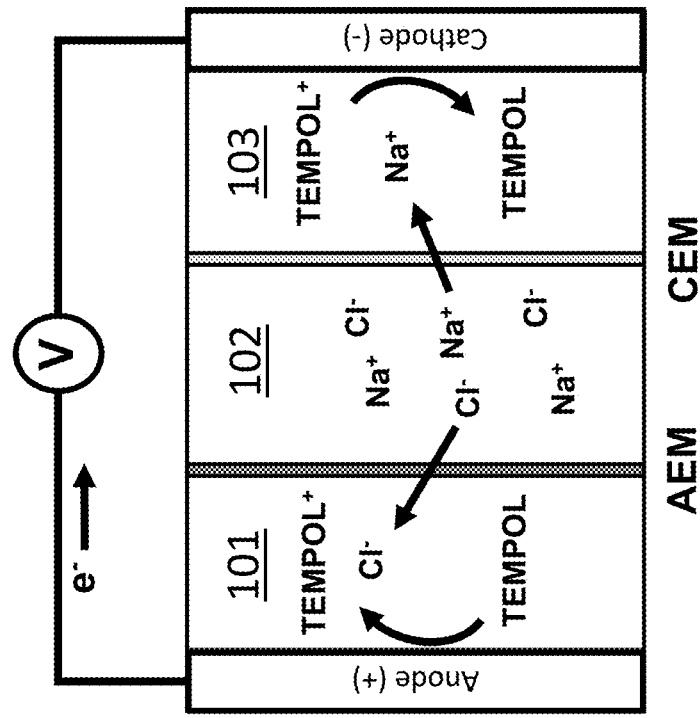
FIGS. 1A-1C show schematic diagrams of the desalination of a saline solution by ED cells.
Figure 1A:
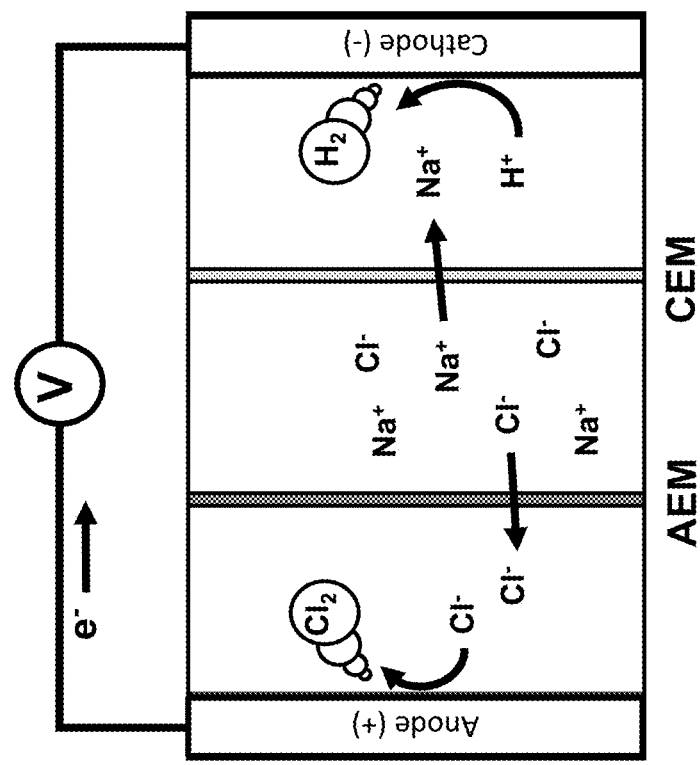

A schematic diagram of a conventional deionization ED cell having three compartments is shown in FIG. 1A. Oxidation occurs in the anode compartment of the cell, resulting in the consumption of anions or the generation of cations, depending upon whether anions or neutral molecules are being oxidized, and reduction occurs in the cathode compartment, resulting in the consumption of cations or the generation of anions, depending upon whether cations or neutral molecules are being reduced. In the ED cell shown in FIG. 1A, Cl$^-$ anions undergo oxidation in the anode compartment and H$^+$ cations undergo reduction in the cathode compartment.

To maintain charge neutrality, anions (for example, Cl$^-$ ions) from the middle compartment, which contains anions and cations in solution (for example, salinated water), will move toward the anode through an anion exchange membrane (AEM) while cations (for example, Na$^+$ ions) will move toward the cathode through a cation exchange membrane (CEM). This results in the deionization of the solution in the middle compartment. However, this is only an illustrative example. The cations and anions removed from the middle compartment need not be sodium cations and chloride anions; the ED cells can be used to remove any cations and/or anions present in the middle compartment to maintain the charge neutrality of the anolyte and catholyte.

The electrical energy required to operate an ED cell is the product of the operating voltage and charge passed. Since the amount of charge passed is determined by the concentration of dissolved salts in a solution (e.g., salinity in the case of salinated water) and the volume of the solution, the cells described herein decrease operating costs by decreasing the operating voltage of the cell using the oxidation and reduction of the reduced and oxidized species of a redox couple having fast redox kinetics as the anode and cathode reactions. By using the forward and reverse of the same electrode reaction in solutions containing equal concentrations of a reduced and an oxidized species of the same redox couple, such as of 4-hydroxy-2,2,6,6-tetramethylpiperidine 1-oxyl (TEMPOL) and its oxidized species (TEMPOL$^+$), the equilibrium potential of the anode reaction ($E^e_{anode}$) becomes equal to the equilibrium potential of the cathode reaction ($E^e_{cathode}$). As a result, the thermodynamic equilibrium voltage of the ED cell, which is $E^e_{cathode} - E^e_{anode}$, is reduced to 0 V. In addition, the redox reactions of redox couples that involve only a one electron transfer with fast kinetics, such as TEMPOL/TEMPOL$^+$, minimizes the overpotential required to drive the electrode reactions (Scheme 1). As a result, the operation of ED cells at the lowest possible voltages can be achieved.

Scheme 1. The redox reactions of TEMPOL and TEMPOL$^+$.

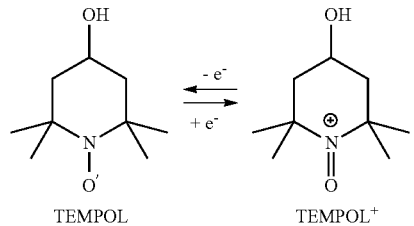

TEMPOL        TEMPOL$^+$

The oxidation/reduction reaction of the TEMPOL/TEMPOL$^+$ redox couple are well suited for use as the electrode reactions to operate ED cells because the TEMPOL/TEMPOL$^+$ redox couple is stable in neutral aqueous solutions (i.e., pH ~7) and is an inexpensive nitroxyl radical derivative. However, the oxidation/reduction reactions of other redox couples with fast redox kinetics could be used as the electrode reactions, provided the redox couple is stable in the solution being deionized. Other examples of redox couples that are stable in aqueous solutions include TEMPO derivatives, such as 4-maleimido-TEMPO, 4-carboxy-TEMPO, 4-amino-TEMPO, 4-methoxy-TEMPO, 4-oxo-TEMPo, TEMPO-4-amino-4-carboxylic acid, 4-acetamido-TEMPO, 4-(2-lodoacetamido)-TEMPO, and the like. Other redox couples that can be used include hydroquinone/benzoquinone and $[Fe(CN)_6]^{3-}/[Fe(CN)_6]^{4-}$.

An embodiment of an ED cell that utilizes the TEMPOL/TEMPOL$^+$ redox couple to desalinate water is shown in FIG. 1B. The ED cell contains three compartments, where an anode compartment 101 containing an anolyte and cathode compartment 103 containing a catholyte sandwich a middle compartment 102 containing an ion-containing solution. Compartment 102 is referred to as the deionization compartment or, when the deionization is a desalination, as the desalination compartment. For the desalination shown in FIG. 1B, the solution in compartment 102 can be, for example, salinated water from a natural body of water (e.g., seawater or brackish water). Both the anolyte and the catholyte include the reduced species and the oxidized species of the redox couple (TEMPOL and TEMPOL$^+$ in the embodiment depicted in FIG. 1B). The anode compartment and middle compartment are separated by an AEM, while the cathode compartment and middle compartment are separated by a CEM. An anode is in electrical communication with the anolyte in anode compartment 101 and a cathode is in electrical communication with catholyte in cathode compartment 103. Electrical communication may be achieved by direct contact between an anode and an anolyte in an anode compartment or a cathode and a catholyte in a cathode compartment. The anode and cathode can be, for example, carbon-containing electrodes, such as graphite electrodes. However, other electrode materials can be used. When a voltage is applied between the anode and the cathode, the oxidation of the reduced species of the redox couple (the oxidation of TEMPOL to TEMPOL$^+$ in the embodiment depicted in FIG. 1B) occurs at the anode, generating cations and thus causing anions (e.g., Cl$^-$ ions) to move from the middle compartment to the anolyte in the anode compartment to keep the charge neutrality in the anode compartment. At the same time, reduction of the oxidized species of the redox couple (the reduction of TEMPOL$^+$ to TEMPOL in the embodiment depicted in FIG. 1B) occurs at the cathode, consuming cations and thus causing cations (e.g., Na$^+$ ions) from the middle compartment to move to the catholyte in the cathode compartment to keep the charge neutrality in the cathode compartment. This results in deionization of the solution in the middle compartment.

A problem with sustaining the operation of the cell in FIG. 1B is that, although the anolyte and catholyte initially contain substantially equimolar amounts of the reduced species and oxidized species of the redox couple, the compositions of the anolyte and catholyte will change once current starts to flow. The ratio of reduced species to oxidized species will gradually decrease in the anolyte, but increase in the catholyte. Due to these concentration changes, the thermodynamic equilibrium voltage of the cell gradually increases from 0 V. Eventually, the anolyte will contain only the oxidized species and the catholyte will contain only the reduced species, causing the cell operation to terminate. Simply swapping the catholyte and the anolyte to re-initiate the operation is not an ideal solution because anions and cations also accumulate in the anolyte and the catholyte, respectively. Therefore, by simply swapping the catholyte and the anolyte, both the catholyte and the anolyte will eventually become highly concentrated with the salt. When the resulting catholyte and anolyte are discarded from the cell, the reducing and oxidized species of the redox couple would need to be recovered, which would make the operation of such a cell impractical.

Figure 1C:
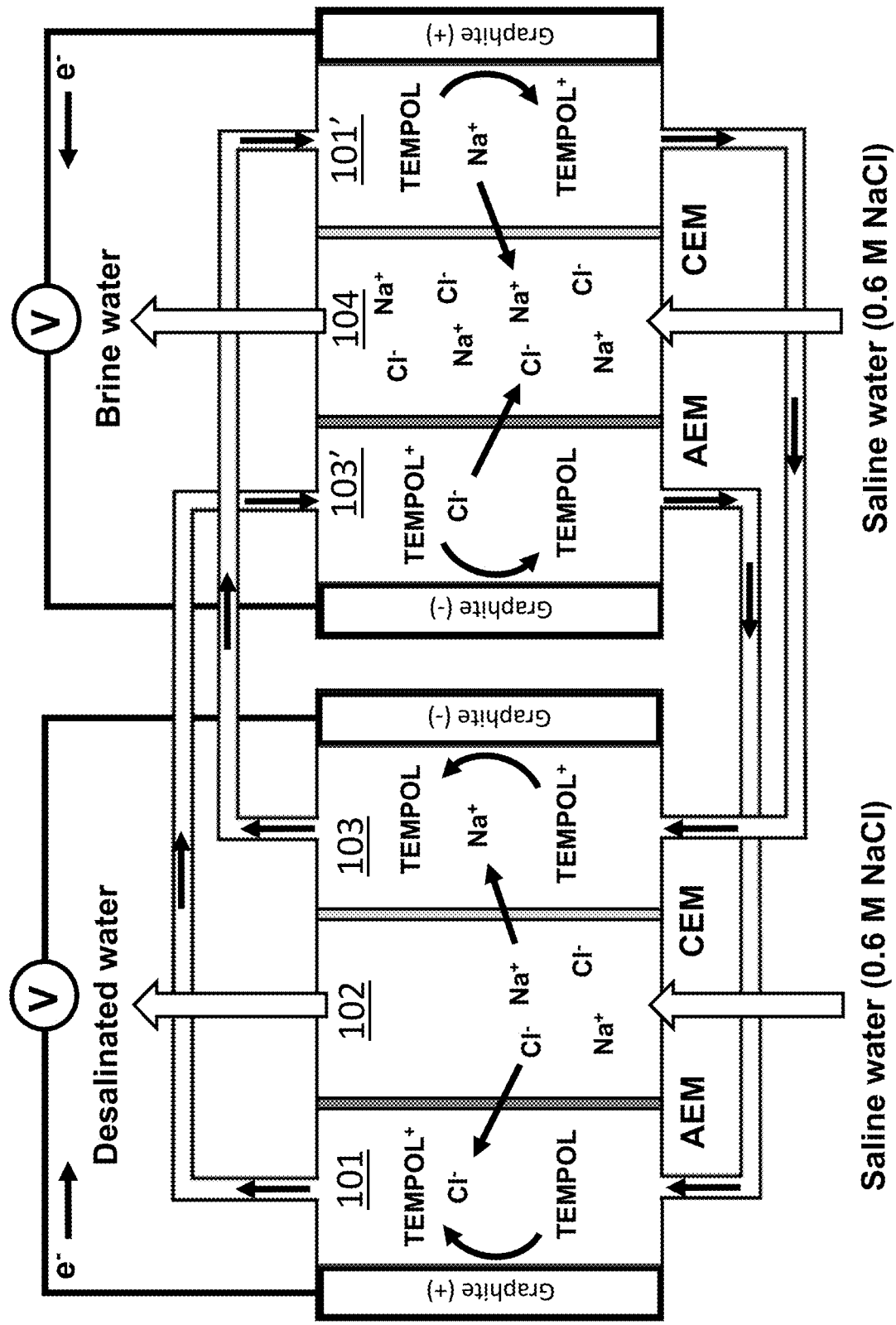

To resolve this issue, an additional ED cell can be coupled with the ED cell of FIG. 1B to perform ion-accumulation in tandem with deionization and to reverse any composition changes in the catholyte and the anolyte that may occur (FIG. 1C). Like the deionization cell shown in FIGS. 1B and 1n the left side of FIG. 1C, the ion-accumulation cell shown on the right side of FIG. 1C includes three compartments, where an anode compartment 101' containing an anolyte and cathode compartment 103' containing a catholyte sandwich a middle compartment 104 containing a solution in which ions are to be accumulated. Here again, the ED cells are shown as desalination and salination cells for illustration purposes only. Compartment 104 is referred to as the ion-accumulation compartment or, when the ions to be accumulated are $Na^+$ and $Cl^-$ ions, as the salination compartment. Cost-effective aqueous solutions that can be used in the salination compartment include wastewater or seawater. As in the deionization cell, the anolyte and the catholyte of the ion-accumulation cell include the reduced species and the oxidized species of a redox couple (TEMPOL and TEMPOL$^+$ in the embodiment depicted in FIG. 1C). The anode compartment and middle compartment of the ion-accumulation cell are separated by an CEM, while the cathode compartment and middle compartment are separated by an AEM. An anode is immersed in the anolyte in anode compartment 101' and a cathode is immersed in the catholyte in cathode compartment 103'.

In the tandem ED cell setup of FIG. 1C, the anolyte of the deionization cell and the catholyte of the ion-accumulation cell are circulated (solid arrows) via conduits connecting the cells so that the composition changes of the reducing and oxidized species and the anion (e.g., $Cl^-$) accumulation in the anolyte of the deionization cell are reversed in the catholyte of the ion-accumulation cell. In the same manner, the catholyte of the deionization cell and the anolyte of the ion-accumulation cell are circulated via conduits connecting the cells so that the composition changes of the reducing and oxidized species and the cation (e.g., $Na^+$) accumulation in the catholyte of the deionization cell are reversed in the anolyte of the ion-accumulation cell. This tandem cell design allows for continuous deionization to be performed without accumulating ions removed from the deionization cell in the anolyte or the catholyte compartments. When the tandem ED cell system is used for desalination applications, salinated water can be sustainably converted to fresh water and brine in the desalination and salination cells, respectively. A variety of voltage sources can be used to apply a voltage between the anodes and the cathodes of the deionization and ion-accumulation cells. In particular, the significant reduction in the operating voltage achieved by the TEMPOL/TEMPOL$^+$-based ED cells makes it possible to operate the ED cells with inexpensive portable power generators (e.g., batteries and solar cells) that can provide only a limited voltage. This can be particularly beneficial when desalination needs to be achieved in regions where grid-based electricity is not available. Since the thermodynamic equilibrium potential of the ED cells is 0 V, ideally, any power generator that can provide a voltage greater than 0 V can be used to operate the ED cells.

Figure 2:
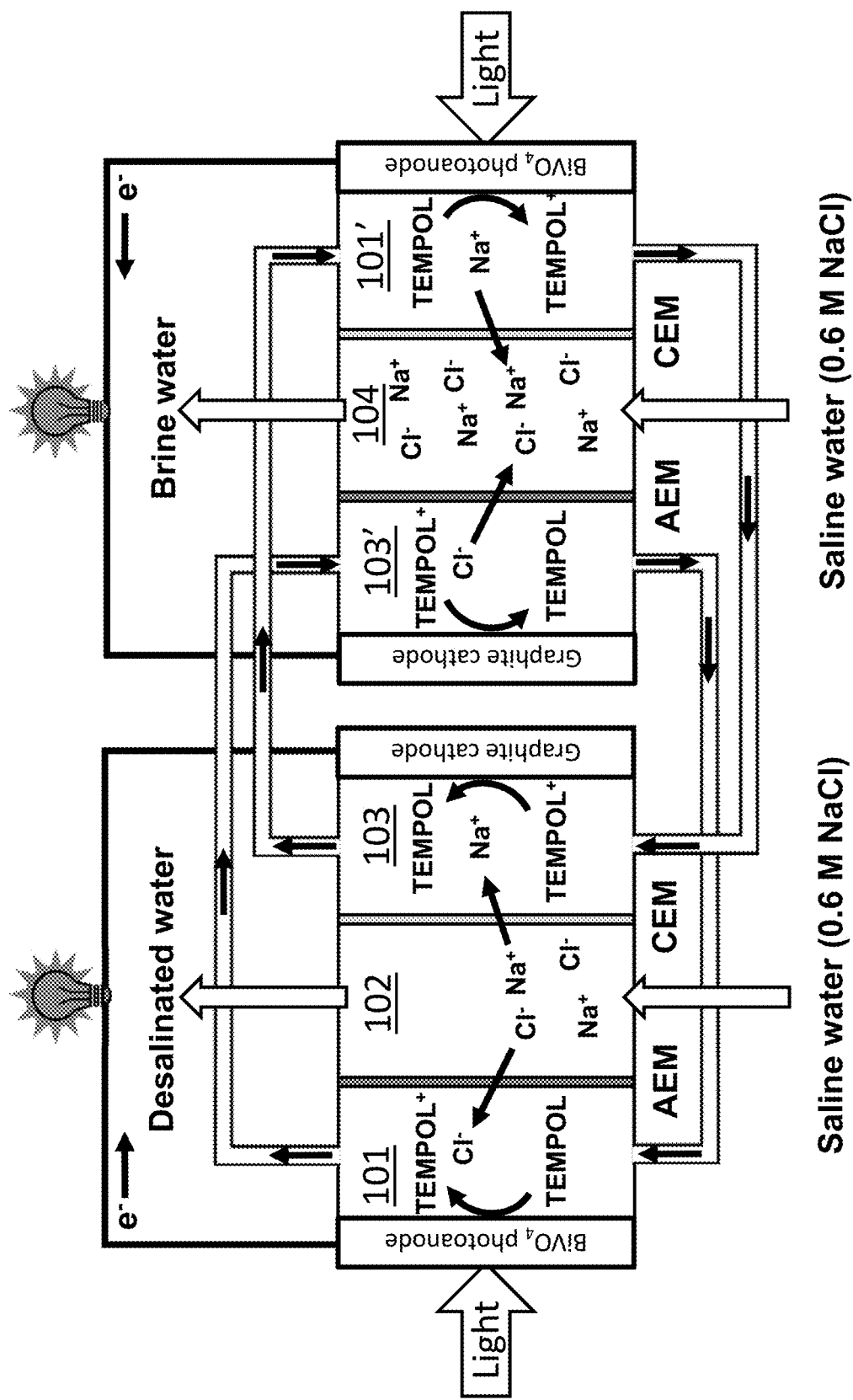
FIG. 2 shows tandem cell system that includes a desalination solar cell and a salination solar cell that can achieve sustainable desalination and salination while generating an electrical output.

One embodiment of a combination deionization/ion-accumulation solar cell system converts solar energy into electricity, while carrying out the deionization and ion-accumulation of ion-containing solutions within the solar cells. This embodiment is shown in FIG. 2. Here again, the deionization/ion-accumulation solar cell system is depicted as a desalination/salination solar cells system that is used to remove sodium cations and chloride anions from a salinated solution. However, the tandem solar cell system could also be used to remove different cations and/or anions from other types of ion-containing solutions. The deionization solar cell and the ion-accumulation solar cell in FIG. 2 have substantially the same design and principle of operation as those shown in FIG. 1C, except that the anodes in the deionization and ion-accumulation cells in FIG. 2 are photoanodes that are made from an n-type semiconductor. In the embodiment of the tandem solar cell system shown in FIG. 2, the photoanodes are n-type $BiVO_4$ photoanodes. However, other photoanode materials can be used, provided that they are substantially stable in neutral solution and have band edge positions suitable for photo-oxidizing/photo-reducing the redox mediator pair using visible light. Such photoanode materials include, for example, $Fe_2TiO_5$, $SnNb_2O_6$, and $Fe_2O_3$. Although both of the anodes in the embodiment of the tandem solar cell system in FIG. 2 are photoanodes, in other embodiments only one of the anodes (i.e., the deionization solar cell anode or the ion-accumulation solar cell anode) is a photoanode. Similarly, in some embodiments of the tandem deionization/ion-accumulation solar cell systems, one or both of the cathodes are photocathodes that are made from a p-type semiconductor. In order to increase the performance and/or stability of the photoelectrodes, the surface of the photoelectrodes can be modified with various coating layers.

Figure 3:
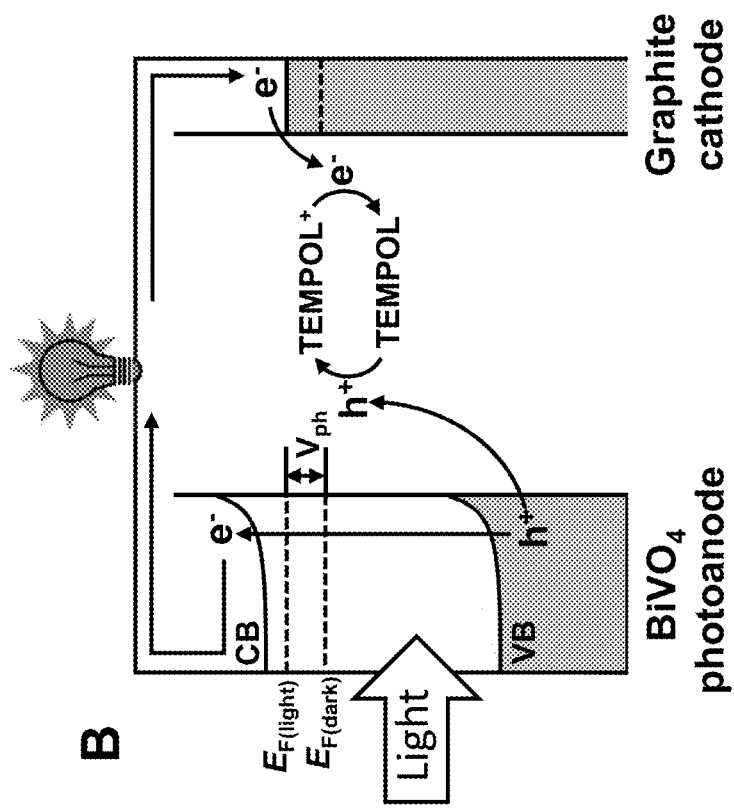
FIG. 3 shows the energetics of a BiVO$_4$ photoanode with a TEMPOL/TEMPOL$^+$ redox couple under illumination. (CB: conduction band, VB: valence band, $E_{F(dark)}$: Fermi level in the dark, $E_{F(light)}$: Fermi level under illumination, $V_{ph}$: photovoltage.)

When the photoanodes of the deionization and ion-accumulation solar cells are illuminated by solar radiation, electrons in the valance band of the photoanode are excited to the conduction band, creating holes in the valance band (FIG. 3). As a result, the photo-oxidation of the reduced species takes place at the photoanode surface to fill in the holes in the valance band and electrons flow from the conduction band of the photoanode to the cathode, generating photocurrent. At the cathode, reduction of the oxidized species takes place. In this case, the anode and the cathode reactions occur spontaneously without the need of an electrical energy input and the photocurrent and photovoltage are generated between the photoanode and the cathode only by illumination. Since the cathode reaction is the reverse reaction of the anode reaction and, therefore, no net chemical change is achieved during electricity generation, this type of solar cell is called a regenerative solar cell.

Since the embodiment of a regenerative solar cell in FIG. 2 was constructed using a three-compartment cell incorporating an AEM and a CEM, the current generation results in the removal of NaCl from the salinated aqueous solution of the desalination solar cell and NaCl injection into the solution of the salination solar cell. This device design enables the achievement of deionization and ion-accumulation with no external energy input, while generating electrical energy and is, thus, called a desalination/salination solar cell.

Figure 6:
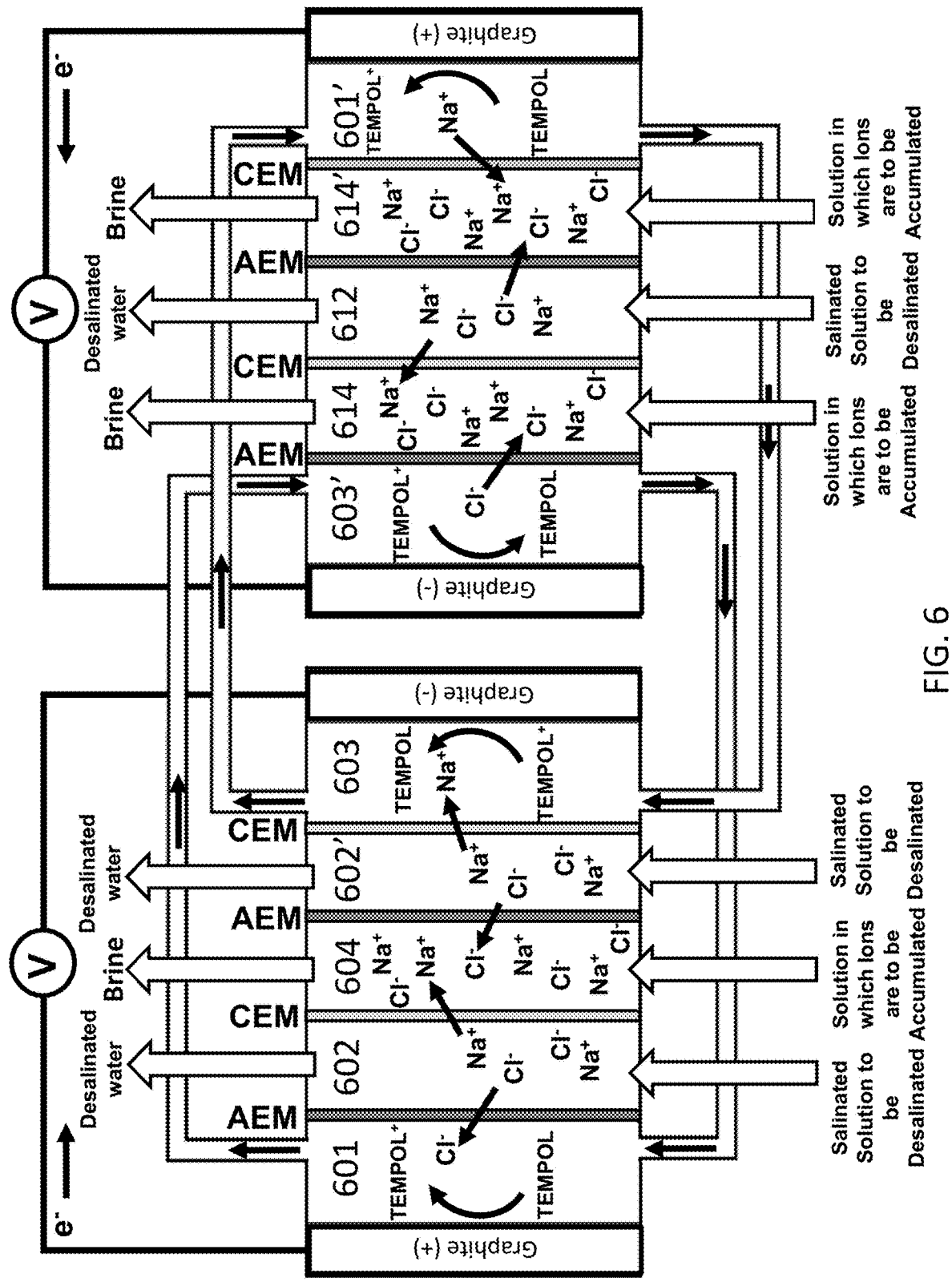
FIG. 6 shows an example of a tandem cell system that includes a deionization cell having two deionization compartments that sandwich a single ion-accumulation compartment and an ion-accumulation cell having two ion-accumulation compartments that sandwich a single deionization compartment.

Although the embodiments of the ED cells depicted in FIG. 1B, FIG. 1C, and FIG. 2 have only three compartments, including a single deionization compartment or a single ion-accumulation compartment, the ED cells can include multiple deionization compartments and/or multiple ion-accumulation compartments. For example, an ED cell can include an anode compartment; a cathode compartment; and at least three middle compartments, wherein the middle compartments are in an alternating arrangement of deionization compartments and ion-accumulation compartments, which are separated by alternating cation exchange membranes and anion exchange membranes. FIG. 6 shows an example of a tandem ED cell system that includes a deionization cell having two deionization compartments 602 and 602' sandwiching a single ion-accumulation compartment 604 and an ion-accumulation cell having two ion-accumulation compartments 614 and 614' sandwiching a single deionization compartment 612. This deionization and ion-accumulation cells further includes an anolyte in an anolyte compartment 601, 601' and a catholyte in a catholyte compartment 603, 603'. During the operation of the cells, ions are removed from an ion-containing solution in deionization compartments 602, 602' and 612 and accumulated in ion-accumulation compartments 604, 614, and 614'. Here again, deionization and ion-accumulation are illustrated using sodium cations and chloride anions, but other ions can be used.

As in the tandem cell systems of FIGS. 1C and 2, one or more conduits connect the anode compartment of the deionization cell and the cathode compartment of the ion-accumulation cell and are configured to allow the anolyte from the deionization cell to circulate into the cathode compartment of the ion-accumulation cell and the catholyte from the ion-accumulation cell to circulate into the anode compartment of the deionization cell. Similarly, one or more conduits connect the cathode compartment of the deionization cell to the anode compartment of the ion-accumulation cell and are configured to allow the catholyte from the deionization cell to circulate into the anode compartment of the ion-accumulation cell and the anolyte from the ion-accumulation cell to circulate into the cathode compartment of the deionization cell. Although the deionization and ion-accumulation cells of FIG. 6 are illustrated using five-compartment cells having three "middle" compartments disposed between an anode compartment and a cathode compartment, the deionization and ion-accumulation cells could have a higher number of compartments.

The examples that follow illustrate the use of the ED cell systems to remove sodium cations and chloride anions from a salinated aqueous solution because they are the only ions present in the deionization compartment use in the examples. However, it should be understood that the ED cell systems described herein can be used to remove any cations and anions present in the deionization compartment. Moreover, the anolyte and the catholyte of the deionization or ion-accumulation cells can contain other supporting electrolytes in addition to the redox couple to aid the conductivity of the solution. For example, in the examples discussed below, 0.6 M NaCl or 0.6 M $NaNO_3$ are used as supporting electrolytes.

EXAMPLES

Example 1

This example illustrates an ED cell where the oxidation and reduction of the same electron mediator are used as the anode and cathode reactions, which significantly lowers the operating voltage compared to traditional ED cells.

The redox reactions of TEMPOL and its oxidized species $TEMPOL^+$ were selected as the electrode reactions to operate the ED cell (i.e., oxidation of TEMPOL at the anode and reduction of $TEMPOL^+$ at the cathode).

Materials. NaCl (99%, Sigma Aldrich), $NaNO_3$ (99%, Sigma Aldrich), 4-OH-TEMPO (TEMPOL) (97%, Sigma Aldrich), $Bi(NO_3)_3 \cdot 5H_2O$ (98%, Sigma Aldrich), KI (99%, Sigma Aldrich), lactic acid (85-90%, Alfa Aesar), $HNO_3$ (98%, Sigma Aldrich), p-benzoquinone (98%, Sigma Aldrich), dimethyl sulfoxide (99.9%, BDH), $VO(acac)_2$ (98%, Sigma Aldrich), NaOH (97%, Sigma Aldrich), $FeSO_4 \cdot 7H_2O$ (99%, Sigma Aldrich), and $K_2SO_4$ (99%, Sigma Aldrich) were used without further purification. Deionized water (Barnstead E-pure water purification system, resistivity >18 MΩ cm) was used to prepare all solutions.

Preparation of $TEMPOL^+$. A 0.6 M NaCl solution containing 50 mM TEMPOL and 50 mM $TEMPOL^+$ was prepared electrochemically in a divided cell separated by an anion exchange membrane (AEM) (PEEK, Fumatech). A three-electrode setup composed of Pt foil as the working electrode, a second Pt foil as the counter electrode, and an Ag/AgCl (4 M KCl) electrode as the reference electrode was used. The electrolyte in the working electrode compartment was 11 mL of a 0.6 M NaCl solution containing 0.1 M TEMPOL. The electrolyte in the counter electrode compartment was 11 mL of a 0.6 M NaCl solution. The complete electrochemical oxidation of TEMPOL to $TEMPOL^+$ was carried out at room temperature with stirring by applying a potential of 1.0 V vs. Ag/AgCl. The resulting 0.6 M NaCl solution containing 0.1 M $TEMPOL^+$ was mixed with an equal volume of 0.6 M NaCl solution containing 0.1 M TEMPOL to form a 0.6 M NaCl solution containing 50 mM TEMPOL and 50 mM $TEMPOL^+$.

Construction of Desalination/Salination ED Cells (FIG. 1B and FIG. 1C).

A custom-built Teflon cell was used for electrodialysis (ED) tests. The cell was composed of three compartments (anode compartment, middle compartment, and cathode compartment) and an AEM or CEM could be inserted as desired between any two compartments. For the desalination cell, an AEM (PEEK, Fumatech) was placed between the anode and middle compartments and a CEM (Nafion 1110, Fumatech) was placed between the middle and cathode compartments. For the salination cell, a CEM (CMI-7000, Membranes International) was placed between the anode and middle compartments and an AEM (PEEK, Fumatech) was placed between the middle and cathode compartments. The inside volume of the anode, middle, and cathode compartments was ~1 mL for each chamber. The area of the graphite anode and graphite cathode exposed to the electrolyte was 1 $cm^2$. The area of the AEM and CEM exposed to the electrolyte was also 1 $cm^2$.

A 0.6 M NaCl solution containing 50 mM TEMPOL and 50 mM $TEMPOL^+$ was used as the anolyte and the catholyte of both the desalination and the salination ED cells. The anolyte of the desalination cell and the catholyte of the salination cell (combined volume of 4.8 mL) were circulated using a peristaltic pump (BT100-2J, Longer pump) with a flow rate of 35 mL $min^{-1}$. The catholyte of the desalination cell and the anolyte of the salination cell (combined volume of 4.8 mL) were circulated in the same manner. The water to be desalinated in the middle compartment (0.6 M NaCl) of the desalination cell (volume of 3.58 mL) was circulated by itself using the same peristaltic pump to enhance the mass transport of salt ions. The water to be salinated in the middle compartment (0.6 M NaCl) of the salination cell (volume of 3.58 mL) was also circulated by itself in the same manner. The salinity of the desalinated and salinated water was examined using a conductivity meter (Horiba D-74). Additionally, a chloride ion meter (Horiba 6560-10C) and a sodium ion meter (Horiba B-722) were used to confirm the results obtained with the conductivity meter.

Figure 4A:
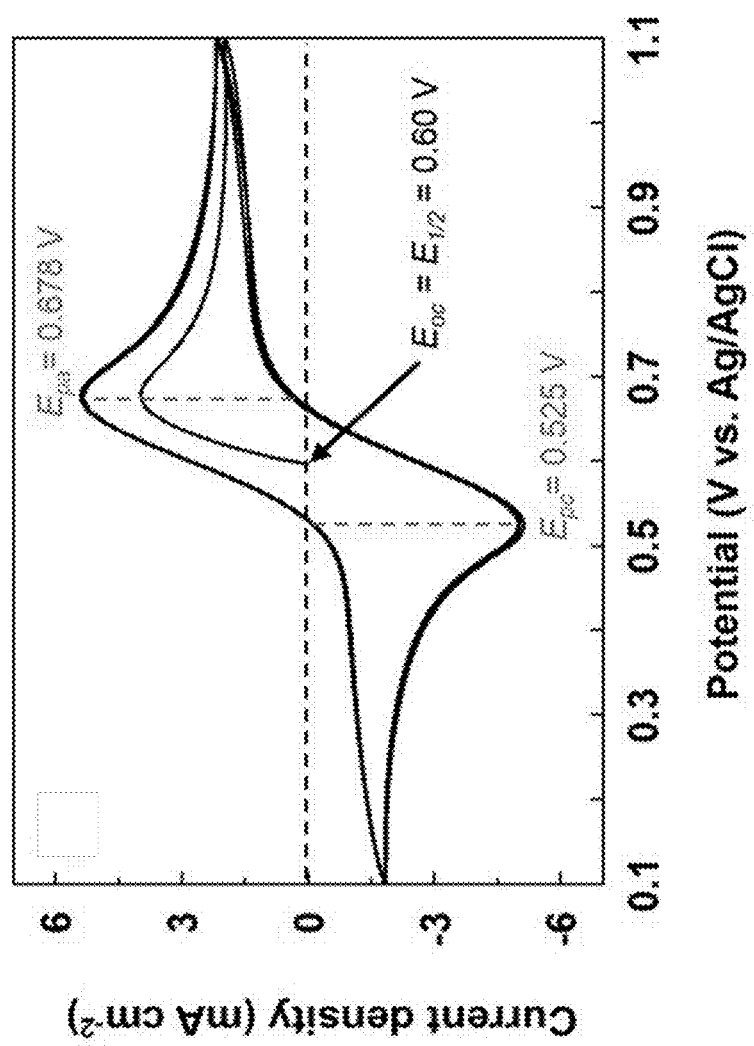
FIGS. 4A-4D depict the electrochemical properties and performance of a TEMPOL/TEMPOL$^+$-based ED cell.
Figure 4B:
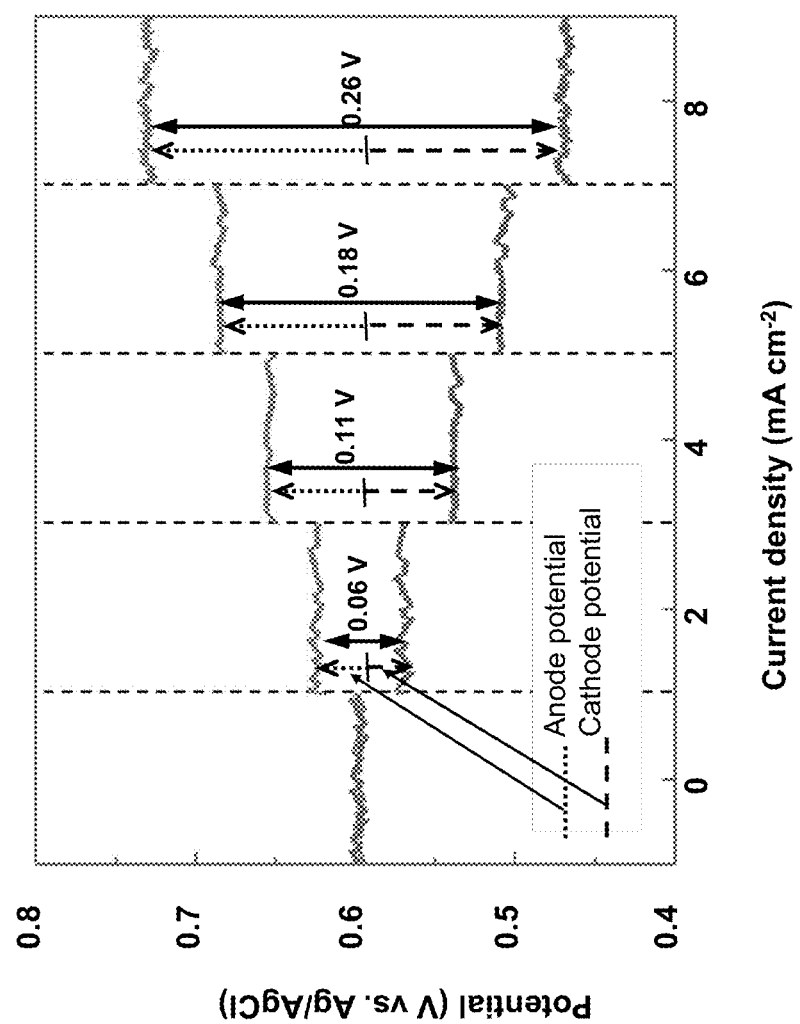

Results. Before constructing an ED cell, the redox properties of a 0.6 M NaCl solution, which mimics the salinity of seawater, containing 50 mM TEMPOL and 50 mM $TEMPOL^+$, were first examined by cyclic voltammogram (CV) obtained in an undivided cell using a three-electrode setup composed of a graphite working electrode, a graphite counter electrode and a Ag/AgCl (4 M KCl) reference electrode (FIG. 4A). From this CV, the half wave potential (E1/2) was estimated to be 0.60 V vs. Ag/AgCl (4 M KCl), which was the same as the open circuit potential of the solution ($E_{OC}$). FIG. 4B shows the voltage applied between the graphite anode and graphite cathode to achieve various current densities. For example, to generate a current density of 8 mA $cm^{-2}$, a bias of only 260 mV was needed. FIG. 4B also shows the individual potentials of the anode and cathode measured against the Ag/AgCl reference electrode at each bias condition. Because the kinetics of the oxidation of TEMPOL and the reduction of TEMPOL$^+$ are equally fast and the solution contains a 1:1 ratio of TEMPOL and TEMPOL$^+$, the cell voltage is symmetrically partitioned to the anode and cathode reactions about the $E_{OC}$ of the solution.

Figure 4C:
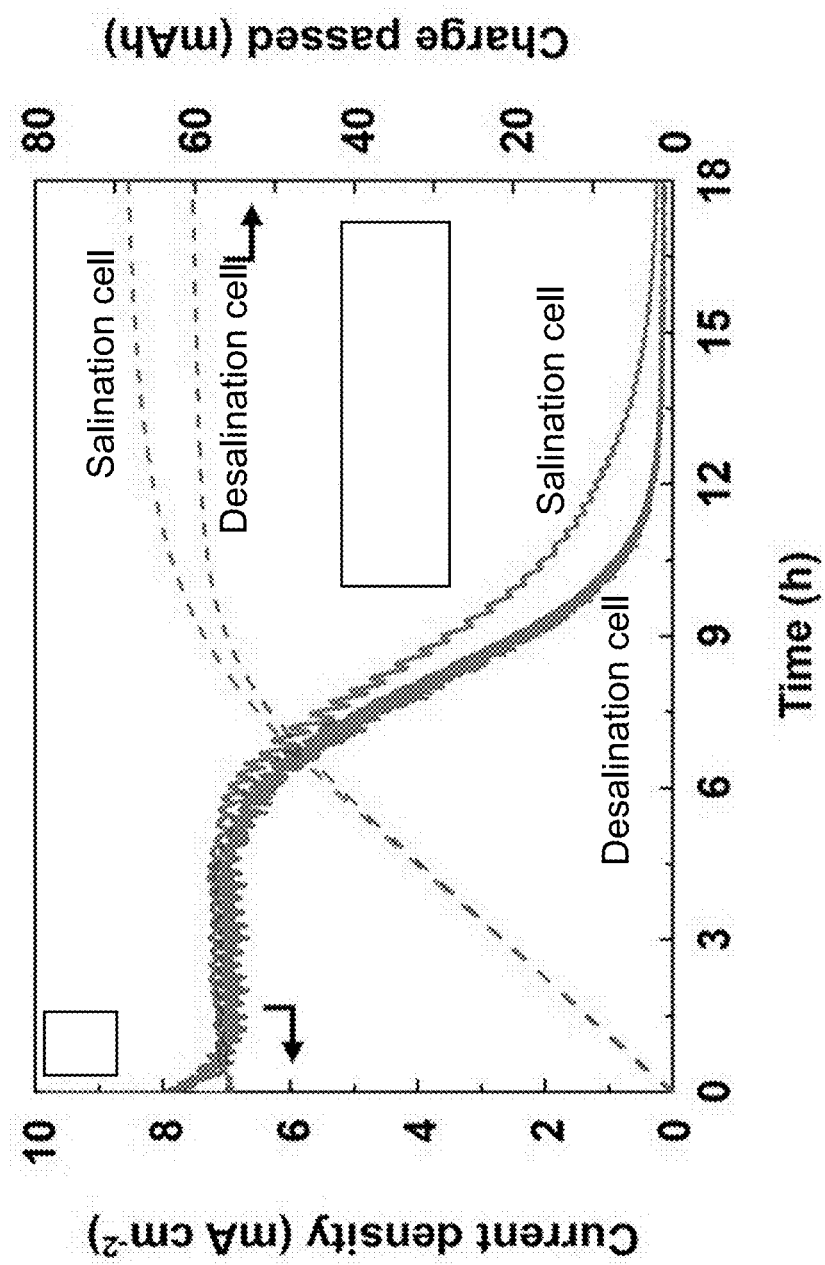
Figure 4D:
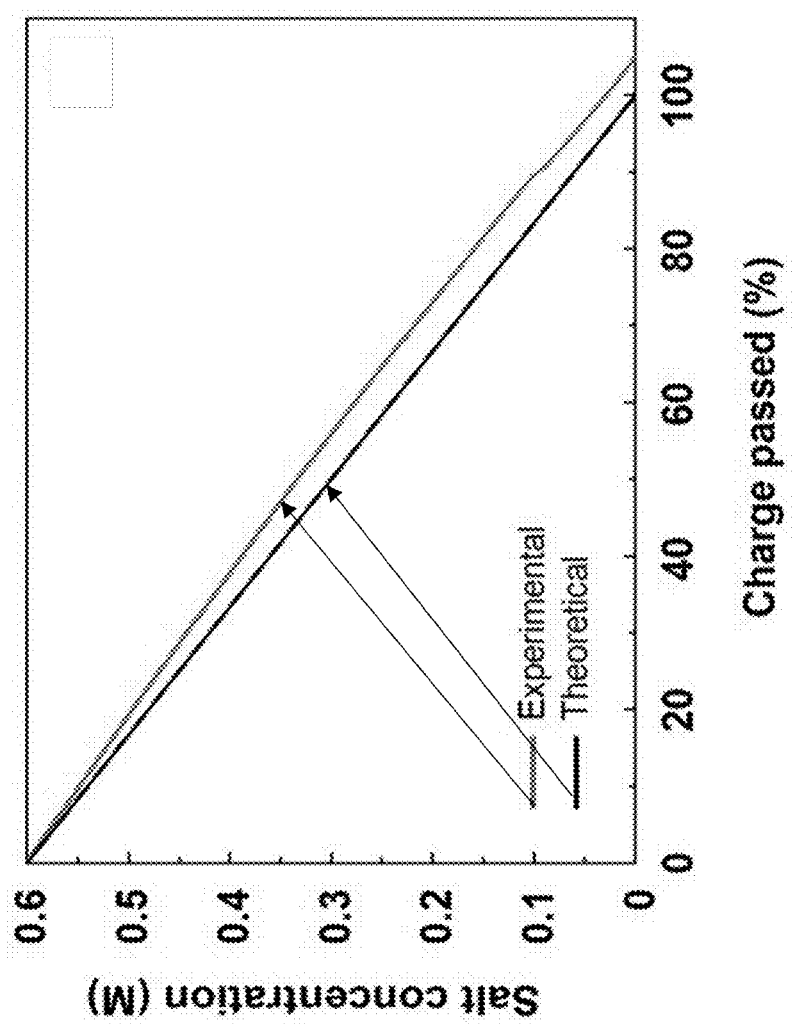

The performance of the combined ED cell system of FIG. 1C was investigated while applying 0.6 V between the anode and the cathode for both the desalination and the salination cells. The feed water to both the desalination and salination cells was 0.6 M NaCl. The current densities-time (J-t) plot and the charge passed-time (Q-t) plot for both the desalination cell and the salination cell are shown in FIG. 4C. The amount of salt ions removed from the feed water (i.e., removal of one Na$^+$ ion and one Cl$^-$ ion per electron) in the desalination cell must be directly proportional to the amount of charge passed during ED operation. This is because current cannot flow through the ED cell without coupled movements of the Na$^+$ and Cl$^-$ ions out of the feed water. This was confirmed by monitoring the salinity of the feed water as a function of charge passed using a salinity meter (FIG. 4D). The salinity of the feed water became zero when 105% of the stoichiometric amount of charge was passed, demonstrating the desalination behavior of the ED cell. In the same manner, charge passed in the salination cell is coupled with the addition of salt ions into the feed water. Indeed, the NaCl concentration of the feed water in the salination cell was confirmed to be 1.2 M when the cell operation was completed.

Although the TEMPOL/TEMPOL$^+$-based ED cells can completely desalinate 0.6 M NaCl at 0.6 V, conventional ED cells cannot even operate at 0.6 V because their thermodynamic equilibrium cell voltages are already ≥1.23 V. The successful operation of the TEMPOL/TEMPOL$^+$-based tandem ED cells demonstrates the use of a redox mediator for sustainable desalination, which can significantly lower the operating voltage of an ED cell to enable seawater desalination.

Example 2

This example demonstrates a tandem ED cell design that incorporates a desalination/salination solar cell to achieve desalination/salination and solar electricity generation in a single device. The tandem cells achieve sustainable desalination/salination operation by using two solar cells, a desalination solar cell and a salination solar cell with their operations coupled by circulating the electrolytes between the two cells (FIG. 2). Each of these solar cells can generate an electrical energy output while performing desalination/salination. The desalination and salination cells were constructed as described in Example 1, except that BiVO$_4$ photoanodes were used in place of graphite anodes.

Preparation of BiVO$_4$.

BiOI electrodes having a surface coating of FeOOH were fabricated according to the methods described in K. J. McDonald, et al., A new electrochemical synthesis route for a BiOI electrode and its conversion to a highly efficient porous BiVO$_4$ photoanode for solar water oxidation; Energy Environ. Sci. 5, 8553-8557 (2012); T. W. Kim, et al., Nanoporous BiVO$_4$ photoanodes with dual-layer oxygen evolution catalysts for solar water splitting; Science 343, 990-994 (2014); T. W. Kim, et al., Simultaneous enhancements in photon absorption and charge transport of bismuth vanadate photoanodes for solar water splitting; Nat. Commun. 6, 8769 (2015); and D. K. Lee, et al., Enhancing long-term photostability of BiVO$_4$ photoanodes for solar water splitting by tuning electrolyte composition. Nat. Energy 3, 53-60 (2018). The layer of FeOOH was deposited on the surface of the BiVO$_4$ to improve performance. Other coating materials that could be used include, for example, Al$_2$O$_3$, SnO$_2$, Nb$_2$O$_5$, Ta$_2$O$_5$, Fe$_2$O$_3$, and ZnFe$_2$O$_4$.

Construction of Desalination/Salination Solar Cells.

The cell configuration and the operating conditions of the desalination/salination solar cells (FIG. 2) were the same as those used for the desalination/salination ED cells. The only difference was that the graphite dark anodes of the desalination/salination ED cells were replaced with BiVO$_4$ photoanodes. A 0.6 M NaCl solution containing 50 mM TEMPOL and 50 mM TEMPOL$^+$ was also used as the anolyte and the catholyte of both the desalination and the salination solar cells. When necessary, the catholyte of the desalination cell (which is the anolyte of the salination solar cell) was replaced with a 0.6 M NaNO$_3$ solution containing 50 mM TEMPOL and 50 mM TEMPOL$^+$.

Results.

Figure 5A:
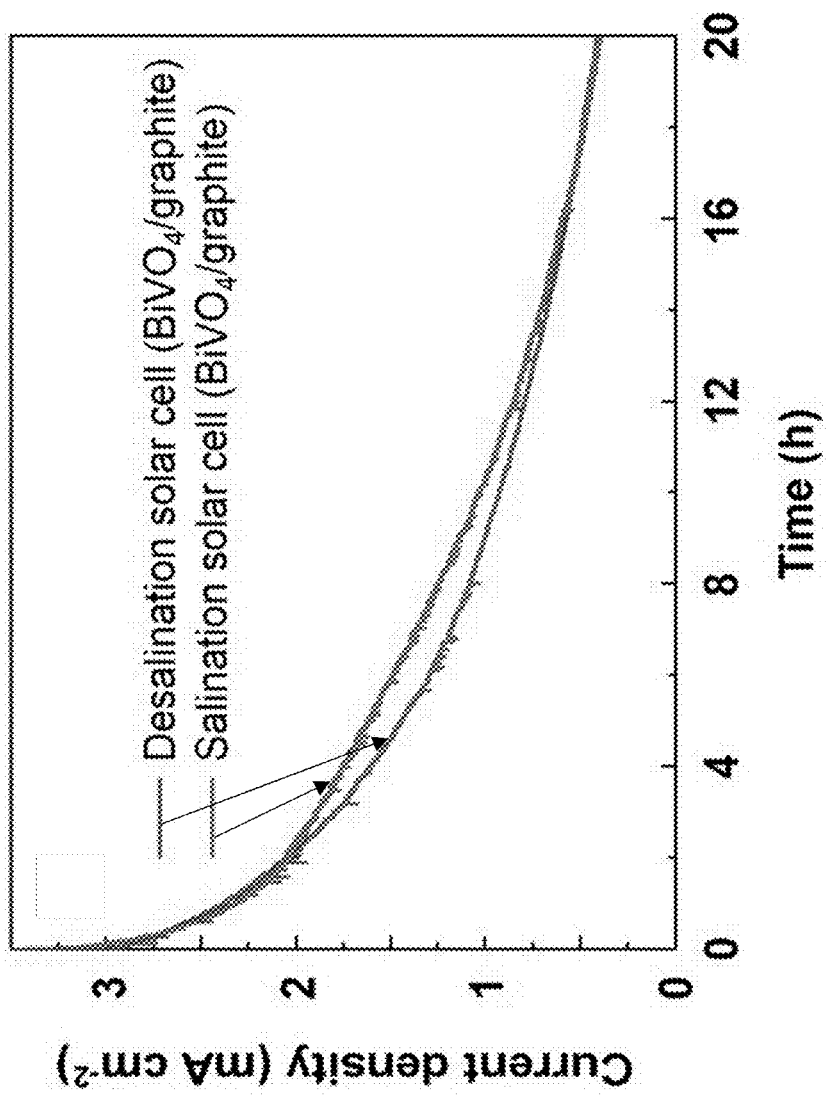
FIGS. 5A-5C show the performances of desalination solar cells.

The desalination/salination solar cells were operated solely by illuminating the BiVO$_4$ photoanodes with light mimicking the solar spectrum (100 mW/cm$^2$, AM1.5G) in both units without providing any external electrical potential. FIG. 5A shows the photocurrent density-time plots of the desalination solar cell and the salination solar cell under short circuit conditions where the current is generated solely by illumination (solar energy conversion) without any external electrical energy input. The photocurrent generation was coupled with NaCl removal in the desalination solar cell and with NaCl accumulation in the salination solar cell. For each charge passed in the photocurrent measurement, 1 NaCl was removed from the feed water of the desalination solar cell and 1 NaCl was injected into the feed water of the salination solar cell. The generation of photoccurents from both the desalination and salination solar cells shown in FIG. 5A demonstrate the successful construction and operation of a desalination/salination solar cell system where desalination/salination becomes part of a process that generates electrical energy, unlike existing desalination technologies that consume energy.

Figure 5B:
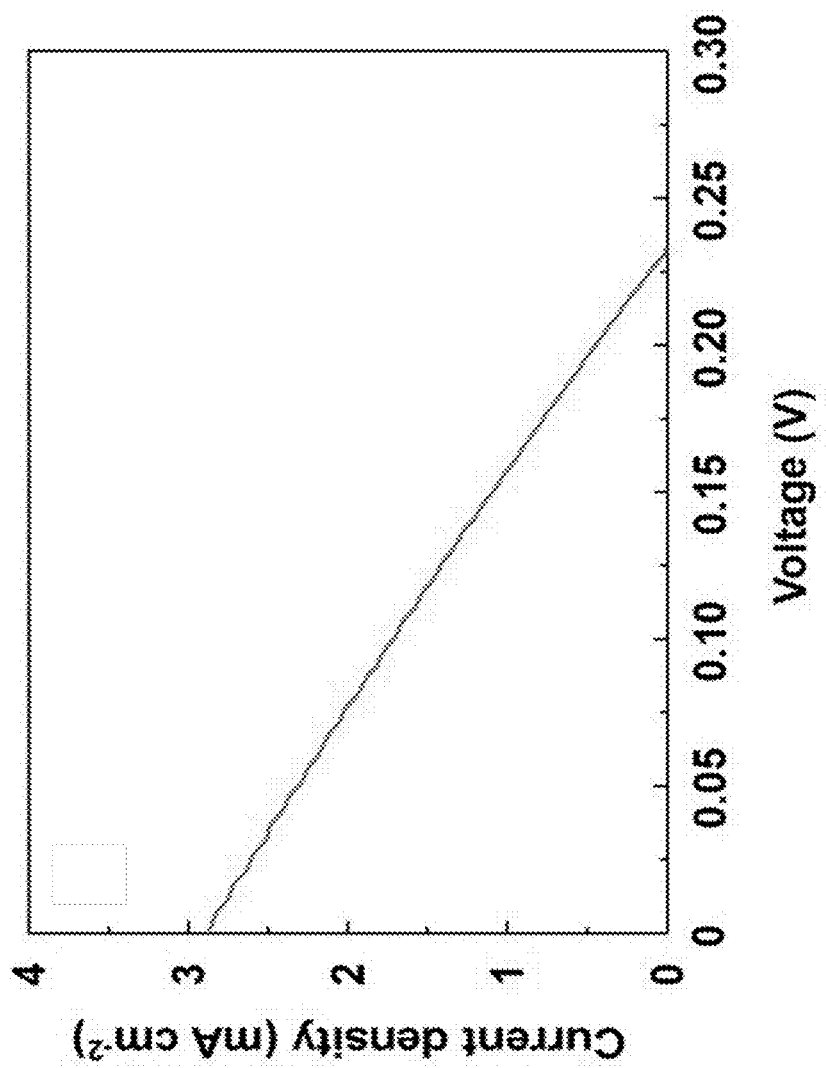
Figure 5C:
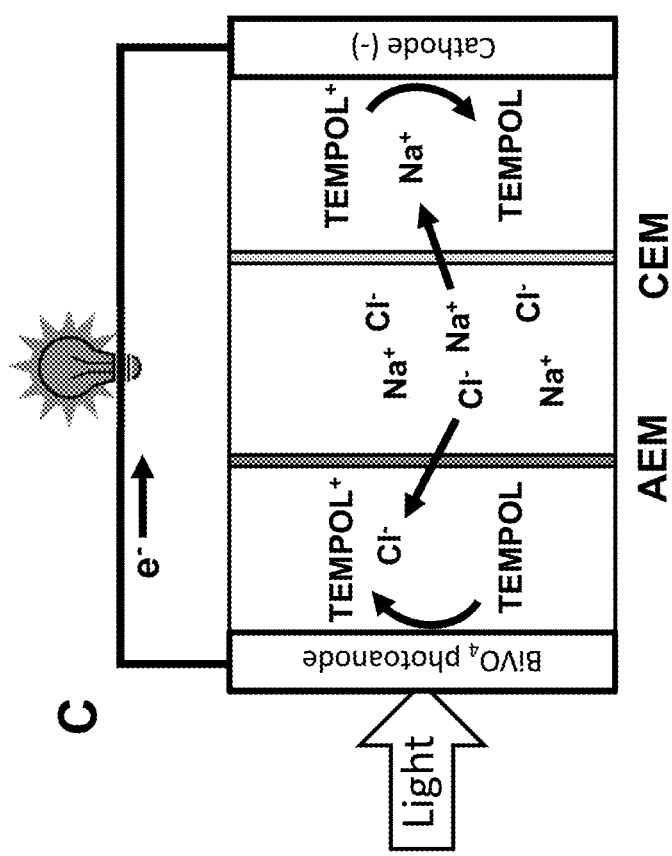

The performance of any solar cell is typically assessed by its photocurrent-voltage (J-V) characteristics under illumination using a two-electrode system. The J-V characteristics of a desalination solar cell is shown in FIG. 5B. (The J-V characteristics of a salination solar cell is expected to be the same as the only difference between the desalination solar cell and the salination solar cell is the location of the AEM and CEM.) This cell is composed of a three-compartment cell, as shown in FIG. 5C. Both the anolyte and catholyte were 0.6 M NaCl containing 50 mM TEMPOL and 50 mM TEMPOL$^+$, which were sandwiching a middle compartment containing 0.6 M NaCl feed water separated by an AEM and a CEM. To mimic the desalination conditions described previously, the anolyte and catholyte were circulated during the J-V measurement. The J-V characteristics obtained in a three-compartment cell showed an open circuit voltage ($V_{OC}$) of 233 mV and a short circuit current ($J_{SC}$) of 2.9 mA cm$^{-2}$ (FIG. 5B). These results demonstrate that the solar cell and desalination functions can be combined to perform desalination while simultaneously generating an electrical energy output. In terms of electricity generation, the performance of the BiVO$_4$-based desalination/salination solar cell may be inferior to other solar cells. However, the main purpose of the desalination/salination solar cell is to achieve desalination/salination with no external energy required; the electrical energy generation is an additional benefit. While all other desalination technologies require an energy input, the concept of achieving desalination/salination with no energy consumption while also generating an electrical energy output is unprecedented.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A tandem deionization system comprising:
    a deionization cell comprising:
        an anolyte in an anode compartment, the anolyte comprising a reduced species and an oxidized species of a dissolved redox couple;
        a catholyte in a cathode compartment, the catholyte comprising the reduced species and the oxidized species of the dissolved redox couple;
        only a single deionization compartment comprising a solution comprising cations and anions between the anode compartment and the cathode compartment, wherein the deionization compartment is bounded by an anion exchange membrane on an anode side of the deionization compartment and by a cation exchange membrane on a cathode side of the deionization compartment;
        an anode in electrical communication with the anolyte in the anode compartment; and
        a cathode in electrical communication with the catholyte in the cathode compartment, wherein the deionization cell has no ion-accumulation compartment; and
    an ion-accumulation cell comprising:
        an anolyte in an anode compartment, the anolyte comprising the reduced species and the oxidized species of the dissolved redox couple;
        a catholyte in a cathode compartment, the catholyte comprising the reduced species and the oxidized species of the dissolved redox couple;
        only a single ion-accumulation compartment comprising a solution between the anode compartment and the cathode compartment, wherein the ion-accumulation compartment is bounded by a cation exchange membrane on an anode side of the ion-accumulation compartment and by an anion exchange membrane on a cathode side of the ion-accumulation compartment;
        an anode in electrical communication with the anolyte in the anode compartment; and
        a cathode in electrical communication with the catholyte in the cathode compartment, wherein the ion-accumulation cell has no deionization compartment;
    one or more conduits connecting the anode compartment of the deionization cell and the cathode compartment of the ion-accumulation cell, wherein the one or more conduits allow the anolyte from the deionization cell to circulate into the cathode compartment of the ion-accumulation cell and the catholyte from the ion-accumulation cell to circulate into the anode compartment of the deionization cell; and
    one or more conduits connecting the cathode compartment of the deionization cell to the anode compartment of the ion-accumulation cell, wherein the one or more conduits allow the catholyte from the deionization cell to circulate into the anode compartment of the ion-accumulation cell and the anolyte from the ion-accumulation cell to circulate into the cathode compartment of the deionization cell.

2. The system of claim 1, wherein the reduced species is TEMPOL and the oxidized species is $TEMPOL^+$.

3. The system of claim 1, wherein the anode of the deionization cell and the anode of the ion-accumulation cell are carbon-containing electrodes.

4. The system of claim 1, wherein the solution in the deionization compartment comprises industrial, commercial, or residential wastewater.

5. The system of claim 1, wherein at least one of the anode of the deionization cell and the anode of the ion-accumulation cell is a photoanode.

6. The system of claim 5, wherein at least one of the photoanodes comprises n-type $BiVO_4$.

7. The system of claim 1, wherein at least one of the cathode of the deionization cell and the cathode of the ion-accumulation cell is a photocathode.

8. The system of claim 1, wherein the anions in the deionization cell comprise chloride anions.

9. The system of claim 1, wherein the solution in the deionization compartment comprises water from a natural body of water.

10. A method for deionizing an ion-containing solution using a tandem deionization system comprising:
    a deionization cell comprising:
        an anolyte in an anode compartment, the anolyte comprising a reduced species and an oxidized species of a dissolved redox couple;
        a catholyte in a cathode compartment, the catholyte comprising the reduced species and the oxidized species of the dissolved redox couple;
        only a single deionization compartment comprising a solution comprising cations and anions between the anode compartment and the cathode compartment, wherein the deionization compartment is bounded by an anion exchange membrane on an anode side of the deionization compartment and by a cation exchange membrane on a cathode side of the deionization compartment;
        an anode in electrical communication with the anolyte in the anode compartment; and
        a cathode in electrical communication with the catholyte in the cathode compartment, wherein the deionization cell has no ion-accumulation compartment; and
    an ion-accumulation cell comprising:
        an anolyte in an anode compartment, the anolyte comprising the reduced species and the oxidized species of the dissolved redox couple;
        a catholyte in a cathode compartment, the catholyte comprising the reduced species and the oxidized species of the dissolved redox couple;

only a single ion-accumulation compartment comprising a solution between the anode compartment and the cathode compartment, wherein the ion-accumulation compartment is bounded by a cation exchange membrane on an anode side of the ion-accumulation compartment and by an anion exchange membrane on a cathode side of the ion-accumulation compartment;

an anode in electrical communication with the anolyte in the anode compartment; and a cathode in electrical communication with the catholyte in the cathode compartment, wherein the ion-accumulation cell has no deionization compartment;

one or more conduits connecting the anode compartment of the deionization cell and the cathode compartment of the ion-accumulation cell, wherein the one or more conduits allow the anolyte from the deionization cell to circulate into the cathode compartment of the ion-accumulation cell and the catholyte from the ion-accumulation cell to circulate into the anode compartment of the deionization cell; and one or more conduits connecting the cathode compartment of the deionization cell to the anode compartment of the ion-accumulation cell, wherein the one or more conduits allow the catholyte from the deionization cell to circulate into the anode compartment of the ion-accumulation cell and the anolyte from the ion-accumulation cell to circulate into the cathode compartment of the deionization cell, the method comprising:

oxidizing the reduced species in the anode compartment of the deionization cell and reducing the oxidized species in the cathode compartment of the deionization cell, causing anions from the solution in the deionization compartment to move from the deionization compartment into the anode compartment of the deionization cell and cations from the solution in the deionization compartment to move from the deionization compartment into the cathode compartment of the deionization cell, thereby deionizing the solution in the deionization compartment;

oxidizing the reduced species in the anode compartment of the ion-accumulation cell and reducing the oxidized species in the cathode compartment of the ion-accumulation cell, causing anions from the anode compartment of the ion-accumulation cell move into the ion-accumulation compartment and cations from the cathode compartment of the ion-accumulation cell to move into the ion-accumulation compartment, thereby ionizing the solution in the ion-accumulation compartment;

circulating the anolyte from the deionization cell into the cathode compartment of the ion-accumulation cell and the catholyte from the ion-accumulation cell into the anode compartment of the deionization cell during the deionization of the solution; and circulating the catholyte from the deionization cell into the anode compartment of the ion-accumulation cell and the anolyte from the ion-accumulation cell into the cathode compartment of the deionization cell during the deionization of the solution.

11. The method of claim 10, wherein the reduced species is TEMPOL and the oxidized species is TEMPOL$^+$.

12. The method of claim 11, wherein the anode of the deionization cell and the anode of the ion-accumulation cell are carbon-containing anodes.

13. The method of claim 12, wherein the solution in the deionization compartment comprises industrial, commercial, or residential wastewater.

14. The method of claim 10, wherein the oxidation of the reduced species in the anode compartment of the deionization cell and the reduction of the oxidized species in the cathode compartment of the deionization cell are induced by applying an electric voltage across the anode and cathode of the deionization cell and further wherein the oxidation of the reduced species in the anode compartment of the ion-accumulation cell and the reduction of the oxidized species in the cathode compartment of the ion-accumulation cell are induced by applying an electric voltage across the anode and cathode of the ion-accumulation cell.

15. The method of claim 10, wherein at least one of the anode of the deionization cell, the anode of the ion-accumulation cell, the cathode of the deionization cell, and the cathode of the ion-accumulation cell is a photoelectrode and the method further comprises exposing the at least one photoelectrode to solar radiation to generate a photocurrent and a photovoltage in the deionization cell or the ion-accumulation cell that includes the at least one photoelectrode.

16. The method of claim 10, wherein the solution in the deionization compartment comprises water from a natural body of water.

* * * * *